T. Lewis
Culinary Utensil
Nº 27,726.  Patented Apr. 3, 1860.

Witnesses:  Inventor;
Thomas Lewis

UNITED STATES PATENT OFFICE.

THOMAS LEWIS, OF MALDEN, MASSACHUSETTS.

SUGAR HOLDER AND DISTRIBUTER.

Specification of Letters Patent No. 27,726, dated April 3, 1860.

*To all whom it may concern:*

Be it known that I, THOMAS LEWIS, of Malden, in the county of Middlesex and State of Massachusetts, have invented a new and useful article which I call a "Dispenser"; and I do hereby declare that the following, taken in connection with the drawings which accompany and form part of this specification, is a description of my invention so clear and exact as to enable those skilled in the art to practice it.

In hotels, restaurants, and in other public places where sugar, in particular, is kept in open bowls, it becomes mixed with dust, is eaten and soiled by flies and other insects, becomes dampened and discolored from carelessness of those who use it, and becomes lumpy from absorption of dampness from the air.

To avoid these and other annoyances, which produce both waste and disgust, is the object of my invention.

This consists in providing a closed receptacle with means for successive discharges of a given quantity of granulated or powdered material contained therein at a convenient height from the base on which the receptacle for the discharged material rests.

Figure 1:
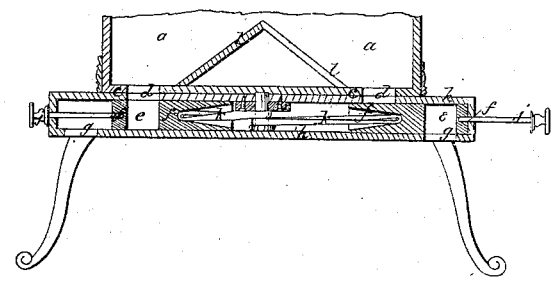
Figure 2:
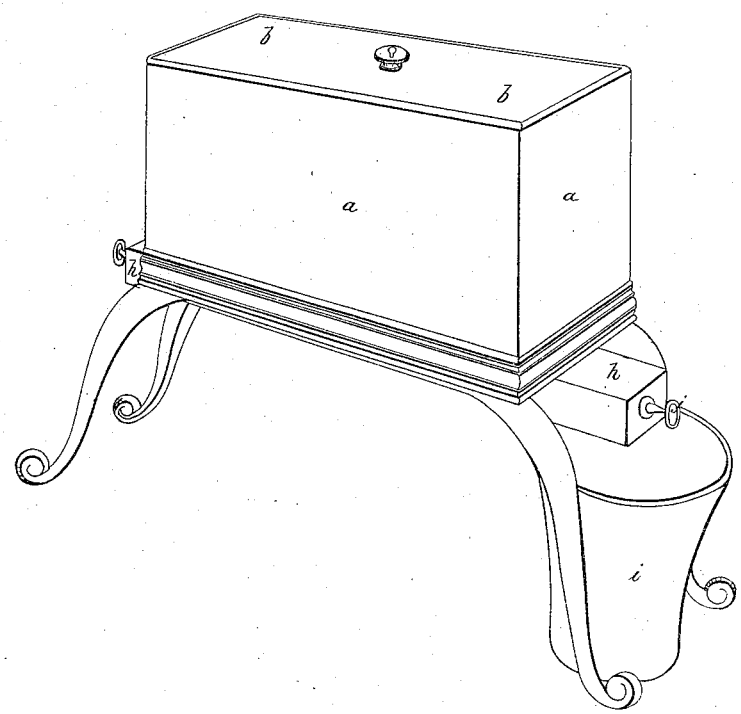

In the drawings Figure 1, is a vertical section through a dispenser embodying my invention. Fig. 2, is a perspective view of the same.

($a$) is the receptacle which may be supplied with sugar, and closed by a cover ($b$). In the base ($c$), openings ($d$), are formed communicating with the discharge pockets ($e$). These are formed, in the instance illustrated, by mortises in the slides, or carriers ($f$), which are made of such length, (extending in the opposite direction from that in which the slides are drawn), as to close the openings ($d$) to cut off discharge of the sugar from ($a$) when the slides are drawn forward so that the pockets ($e$) shall communicate with the openings ($g$) formed in the slider case ($h$) through which the sugar is discharged into a tumbler or cup ($i$). The sliders are drawn forward by the knobs and wires ($j$), extending the springs ($k$), the contraction of which draws back the slides till the pockets are in position, under the openings ($d$), to be again filled from ($a$). An incline ($l$) is so arranged within ($a$) as to direct the sugar toward the openings ($d$), by means of which very nearly all of the sugar can be emptied from ($a$) by reciprocation of the pockets.

Having described my invention, what I claim as new, and desire to secure by Letters Patent of the United States, is—

The combination of a receptacle ($a$) with spring ($k$) and pockets ($e$) when the latter is arranged substantially as and for the purpose specified.

THOMAS LEWIS.

Witnesses:
J. B. CROSBY,
W. B. GLEASON.